UNITED STATES PATENT OFFICE.

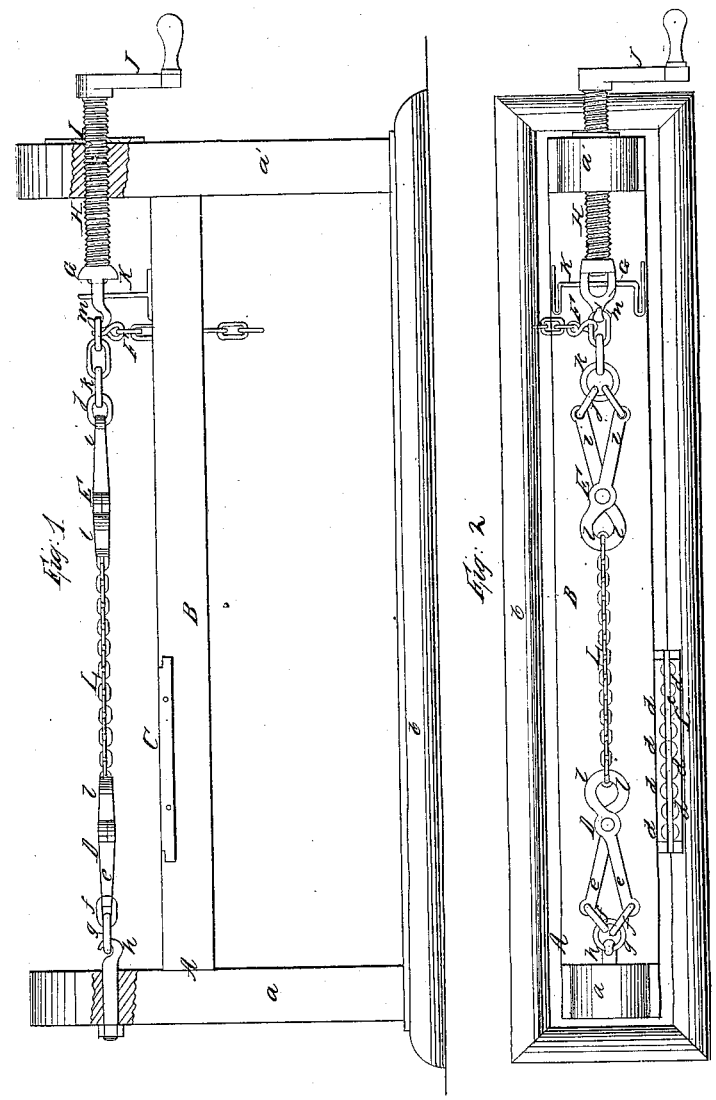

CHARLES HALL, OF NEW YORK, N. Y.

IMPROVED MACHINE FOR STRETCHING CHAINS.

Specification forming part of Letters Patent No. 43,987, dated August 30, 1864.

*To all whom it may concern:*

Be it known that I, CHARLES HALL, of the city, county, and State of New York, have invented a new and Improved Machine for Stretching Chains; and I do hereby declare that the following is a full, clear, and exact description thereof, which will enable others skilled in the art to make and use the same, reference being had to the accompanying drawings, making a part of this specification, in which—

Figure 1 is a side view of my invention, partly in section; Fig. 2, a plan or top view of the same.

Similar letters of reference indicate like parts.

This invention relates to a new and useful device for stretching chains, those which are designed for working over pulleys, whereby the links are all brought to a uniform length, so that they will all engage with the teeth on the pulleys or fit properly or snugly in recesses made therein.

The great difficulty of driving machinery or shafting by means of pulleys and chains has hitherto been owing to the variation in the links, some being shorter than others, so that many would not engage with the teeth of the pulleys or fit properly in recesses made in the peripheries of the pulleys to receive them.

A represents a framing composed of two uprights, $a$ $a'$, attached to a suitable base, $b$, and connected near their upper ends by a horizontal bar, B. To one side of this bar B there is attached a gage, C, composed of a bar having a groove, $c$, made longitudinally in its upper surface, and curved notches $d$ at each side of the upper part of said groove, the notches $d$ being all of the same size and at equal distances apart, corresponding precisely to the alternate links of a uniform and perfect chain. (See Fig. 2.)

D represents a pair of tongs, the ends of the tongs $e$ of which are connected by links $f$ $f$ to a ring, $g$, fitted on a hook, $h$, in the uprights $a$. E is a similar pair of tongs, the tongs $i$ $i$ of which are connected by links $j$ $j$ to a ring, $k$, having a chain, F, secured to it. The jaws $l$ of the two pairs of tongs have grooves made in their ends to receive the horizontal links of the chain, the portions of the jaws at each side of the grooves grasping the upright links. By this means the tongs are enabled to grasp the chain firmly. The chain F is fitted on a hook. $m$, on the end of a swivel, G, on a screw, H, which passes horizontally through a nut, I, attached to the upright $a'$, said screw having a crank, J, on its outer end.

K is a support, the upper end of which is fitted in the swivel G, and serves to prevent the hooks connecting the chain and tongs from twisting. This support slides freely on the bar B.

L represents the chain, to be operated upon any uneven portions of said chain—that is to say, portions having links of different sizes or lengths are fitted between the tongs D E, and the chain F, being fitted on the hook $m$, the screw H is turned and the portion of the chain between the tongs stretches the tongs under the pull or tension, grasping the chain firmly. Any portion of the chain L, from one to any number of links, may be thus stretched where necessary. The gage C is used for testing the chain after being stretched in order to insure correctness and uniformity in the links, the groove $c$ receiving the vertical links and the notches $d$ the horizontal ones. Thus by this simple arrangement chains may be stretched so that their links will be of uniform length to work perfectly over pulleys.

Having thus described my invention, I claim as new and desire to secure by Letters Patent—

1. The employment or use of the two pairs of tongs, D E, or other suitable clamps, in connection with the screw H, or its equivalent, arranged substantially as and for the purpose specified.

2. The chain F, or its equivalent, in connection with the swivel G, for conveniently connecting the tongs E to the screw H, as set forth.

3. The gage C, when used in combination with the tongs D E, and screw H, or its equivalent, for the purpose specified.

CHARLES HALL.

Witnesses:
J. P. HALL,
WM. F. MCNAMARA.